No. 813,129. PATENTED FEB. 20, 1906.
R. T. WINGO.
MECHANICAL MOVEMENT.
APPLICATION FILED JAN. 16, 1904.

2 SHEETS—SHEET 1.

WITNESSES, INVENTOR,
James H. Thurston Richard T. Wingo
Catherine G. Bradley. by Wilmarth H. Thurston
ATTY.

UNITED STATES PATENT OFFICE.

RICHARD T. WINGO, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

MECHANICAL MOVEMENT.

No. 813,129.          Specification of Letters Patent.          Patented Feb. 20, 1906.

Application filed January 16, 1904. Serial No. 189,318.

*To all whom it may concern:*

Be it known that I, RICHARD T. WINGO, of Providence, in the county of Providence and State of Rhode Island, have invented certain new and useful Improvements in Mechanical Movements; and I do hereby declare the following specification, taken in connection with the accompanying drawings, forming a part of the same, to be a full, clear, and exact description thereof.

The primary object of the invention is to provide a construction for insuring the proper timing of an intermittently-operated mechanism with relation to the operation of two other mechanisms which may be alternately thrown into operation where it is desirable that the intermittent mechanism be operated only when the throwing of one of the two mechanisms into operation follows the throwing of the other out of operation. In embodying this feature of the invention in a simple and efficient construction and one in which the parts operated by the intermittently-operating mechanism are securely locked in position between operations I have employed certain further features of invention. Certain of these features relate to devices for insuring the proper timing and operation of the clutch which I employ for operating the intermittent mechanism. These devices consist of rotary member or members carried by the clutch and non-rotary member or members movable into and out of the path of the rotary members. These members are so arranged and operated that in disengaging a non-rotary member from a rotary member to throw the clutch into operation a non-rotary member is moved into the path of a rotary member ready to throw the clutch out of operation, so that there is no danger of failure to throw out at the proper time or of operating improperly. Certain further features relate to the devices for connecting the intermittent clutch with the parts to be operated thereby and locking said devices in position between operations. Further features relate to the devices for operating the clutch for throwing the two mechanisms into and out of operation. These features, as well as the other features and combinations which contribute to the simplicity and efficiency of the mechanism, will be more definitely set forth in the claims.

In the accompanying drawings is shown a mechanism embodying the various features of my invention in the forms which I prefer to employ.

Figure 1:
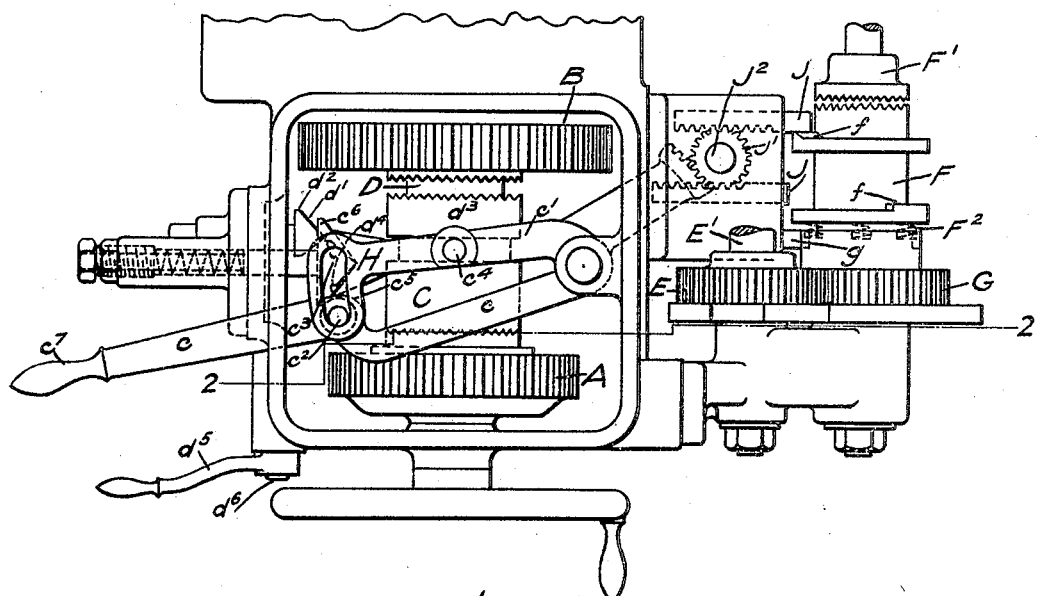
Figure 2:
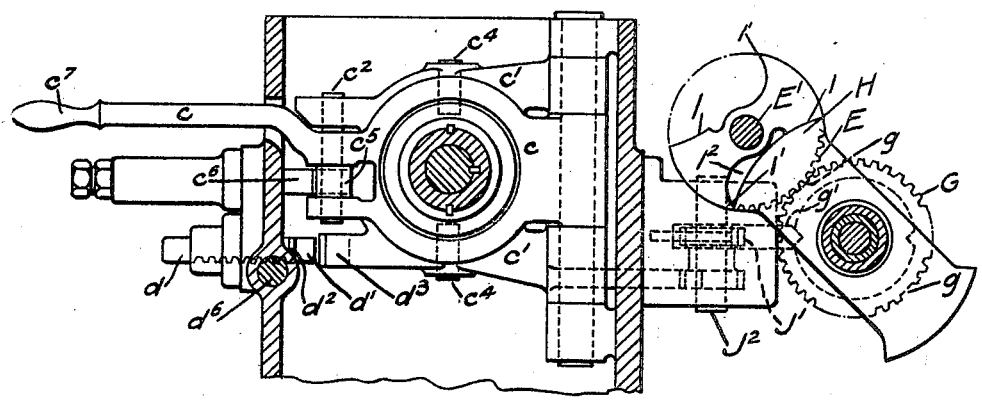
Figure 3:
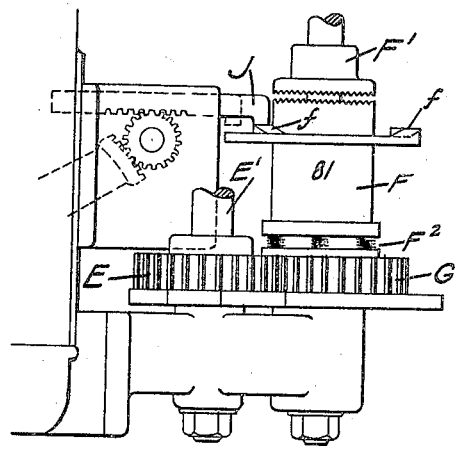
Figure 4:
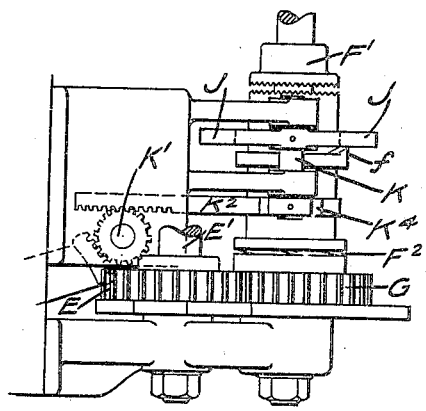
Figure 5:
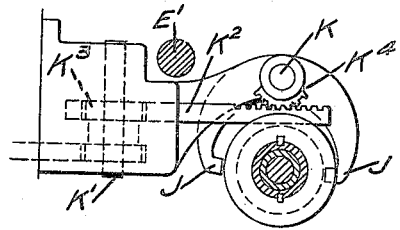
Figure 6:
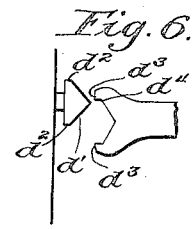

In the drawings, Figure 1 is a plan view of such mechanism. Fig. 2 is a sectional elevation on line 2 2, Fig. 1. Fig. 3 is a plan view showing a modified form of intermittently-operating mechanism; and Figs. 4 and 5 are a plan and elevation, respectively, of a further modification. Fig. 6 is a detail of the devices for locking the clutch in mid-position.

In the construction shown the two mechanisms which may be alternately thrown into operation are indicated as two gears A and B, loosely mounted on a shaft D, with which either may be connected by a clutch C. The clutch is connected to rotate with the shaft, while being free to slide thereon, and is provided with clutch-teeth arranged to engage clutch-teeth on the gears A and B. The gears may be driving mechanisms for operating the shaft either in opposite directions or at different speeds, or they may be parts of mechanisms which are driven from the shaft. The devices for shifting the clutch C to throw the gears A and B into or out of operation consist of two levers $c$ $c'$, mounted upon a common pivot and connected by a pin $c^2$ on the lever $c$, which plays in a slot $c^3$ in the lever $c'$. The lever $c'$ is connected with the clutch by means of pins $c^4$, which engage an annular groove in the clutch. The ends of the slot $c^3$ form shoulders for connecting the levers, while allowing a limited movement of the lever $c$ independent of the lever $c'$ and the clutch. When the lever $c$ is operated to shift the clutch, its movement is not imparted to the lever $c'$ until the play or lost motion between the levers has been taken up. During this independent movement of the lever $c$ a roller $c^5$, mounted thereon, acts against one side of the V-shaped end of a spring-pressed plunger $c^6$, forcing the plunger back against the tension of its spring. At the time that the lost motion between the levers $c$ $c'$ is taken up the roller $c^5$ passes the apex of the V on the plunger $c^6$, so that the opposite side of the V acts against the roller to suddenly complete the movement of the lever $c$. During this part of the movement of the lever $c$ the pin $c^2$ is in engagement with the end of the slot $c^3$, so that the lever $c'$, and consequently the clutch C, move with the lever c, thereby suddenly shifting the clutch from one gear to the other.

By the mechanism just described, in which the shifting of the clutch in either direction is effected by a spring device which is set by the initial independent movement of the clutch-shifting device, the teeth of the clutch are suddenly disengaged from one gear and are forced into engagement with the other gear by a yielding pressure. The teeth of the clutch, therefore, are not subjected to severe strain while partially disengaged, as would be the case if the movement of the clutch in disengaging it from one gear and engaging it with the other were gradual, and neither is there danger of injury to the parts in case the tops of the teeth are brought into engagement in engaging the clutch.

The initial movement of the lever $c'$ may be effected by means of automatic devices operated by some moving part of the machine in which the mechanism is embodied, or it may be effected manually by means of a handle $c^7$, formed on the end of the lever $c$.

With the construction of clutch-shifting mechanism described the spring device always tends to force the clutch into engagement with one of the gears, and the clutch cannot, therefore, be conveniently shifted into mid-position and held in such position by operating the lever $c$. To enable the clutch to be conveniently shifted into mid-position and held therein until it is desired to throw one of the mechanisms into operation, I have employed an additional device by the operation of which the clutch may be disengaged from either gear and held in mid-position. This device consists of a bar $d$, provided at its forward end with oppositely-inclined cam-surfaces $d'$ and parallel locking-surfaces $d^2$. This bar coöperates with two shoulders $d^3$, formed on the lever $c'$, and with parallel surfaces $d^4$, arranged to register with the surfaces $d^2$. The arrangement of the bar and the shoulders on the lever $c^2$ is such that when the bar is advanced one of the cam-surfaces $d'$ will act against one of the shoulders $d^3$ and move the clutch away from the gear with which it is in engagement until the locking-surfaces $d^2$ register with the surfaces $d^4$, when the surfaces $d^2$ will pass between the shoulders $d^3$, thus locking the lever $c'$ in mid-position against the action of the spring-plunger $c^6$, which tends to return the clutch into engagement with the gear from which it has been disengaged. When the bar is retracted, the spring-plunger acts to return the clutch into engagement with the gear from which it was disengaged. The bar may be advanced and retracted by operating a lever $d^5$, secured to the end of a rock-shaft $d^6$, which is provided with a pinion engaging rack-teeth on the bar.

The intermittently-operated mechanism which is to be accurately and positively timed with relation to the operation of the two mechanisms thrown into and out of operation by the movement of the clutch C is indicated as a gear E, operated through an intermittently-rotating clutch F. The gear E is secured to a shaft $E'$, through which the parts to be intermittently operated may be driven. The gear E is connected with the intermittently-operated clutch through a driving-gear G, which makes the same number of revolutions as the gear E and is provided with blank spaces $g$, which register with the gear E when the clutch F is disengaged or out of operation. When the clutch is out of operation and a blank space $g$ is opposite the teeth of the gear E, the gear E and the parts connected with it are locked in position by means of a locking-segment H, secured to the gear G and arranged to coöperate with two locking-shoes I $I'$, secured to the gear E. There is a clearance-space $I^2$ between the locking-shoes, so that the gear E may begin its revolution as soon as the locking-segment H has turned sufficiently to clear the rear locking-shoe $I'$. This construction of locking-segment and locking-shoes firmly locks the shaft in the position into which it is turned by the gear G, and by reason of the clearance-space $I^2$ very little lost motion between the gear G and gear E is required to effect the unlocking of the shaft. Consequently only one or two teeth need be removed from the gear G in forming the blank space $g$, and only a slight movement of the gear G brings the teeth of this gear into mesh with the teeth of the gear E. The intermittently-operated mechanism is always under the positive control of either the gear G or the locking-segments and shoes, and there is no possibility, therefore, of getting the shaft and the parts operated thereby out of time with the gear G and cam F. The devices for controlling the operation of the clutch F are so constructed and arranged that the clutch makes a half-revolution each time that it is thrown into operation, and consequently the gear G is provided with two blank spaces $g$ and two locking-segments, and two pairs of coöperating locking-shoes are connected with gear E.

The clutch F is connected to rotate with the gear G, while being free to move longitudinally in relation thereto, and is forced toward a constantly-rotating clutch member $F'$ by springs $F^2$, interposed between the clutch and the hub of the gear G. The clutch is held out of engagement with the clutch member $F'$ against the tension of the springs $F^2$ by the coöperation of cams $f$, carried with the clutch, and abutments J, movable into and out of the path of the cams. As stated, the clutch F is to make a half-revolution each time it is thrown into operation, and the cams $f$ are accordingly arranged on diametrically opposite sides of the clutch. The abutments J are arranged on the same side of the cam and are in the form of plungers arranged to slide into and out of the path of the cams $f$. The plungers are so connected or operated that one of them moves into the path of a cam $f$ as the other is disengaged from the other cam $f$, and consequently there is always an abutment in the path of a cam ready to throw the clutch F out of engagement with the clutch member F'. There is no possiblity, therefore, for the clutch to make more than a half-revolution or to get out of time with the devices which operate the plungers J. The plungers J are connected so that the inward movement of one is accompanied by an outward movement of the other by means of a pinion J', which lies between the plungers and engages rack-teeth formed thereon. The pinion J' is secured to a short vertical shaft $J^2$, which is rocked at the proper times to operate the plungers J. When this shaft is rocked to withdraw one of the plungers J from engagement with a cam $f$ and allow the clutch F to engage the rotating clutch member F', the other plunger J is advanced into the path of the other cam $f$, so that as the clutch completes a half-revolution this cam $f$ acts against the abutment J to disengage the clutch from the rotating clutch member. The clutch and gear G are held in position after each half-revolution by a spring-operated pin $g'$, having a V-shaped end arranged to engage notches in the hub of the gear.

To avoid any possibility of getting the intermittently-operated mechanism out of time with the mechanisms thrown into and out of operation by the clutch C, the plungers J, the movement of which determines the operation of the intermittent mechanism, are controlled by the movement of the clutch C. The connection between the clutch C and the plungers J consists of a segment C', projecting rearwardly from the lever $c'$ and engaging a pinion $J^3$, secured to the shaft $J^2$. With this connection between the clutch C and the plungers J the movement of the clutch from one of the gears A B to the other will result in withdrawing one of the plungers J from engagement with a cam $f$ and the advance of the other plunger into the path of the other cam $f$, and consequently will result in the operation of the intermittent mechanism. The movement of the clutch C into mid-position will not, however, result in sufficient movement of the plunger J to disengage it from the cam $f$, and consequently if the clutch is moved into mid-position and is afterward returned into engagement with the same gear from which it was disengaged there will be no operation of the intermittent mechanism. If, however, the clutch C is disengaged from one gear and moved into mid-position and is subsequently moved into engagement with the other gear, then the plungers J will be operated to throw the intermittent mechanism into operation. Whenever, therefore, the engagement of the clutch C with one of the gears follows the disengagement of the clutch from the other gear, the intermittent mechanism will be operated, and it will be operated at such time only. There is no possibility, therefore, for the intermittent mechanism to get out of time with either of the mechanisms controlled by the clutch C.

With the construction described, in which the clutch F makes a half-revolution each time it is thrown into operation and in which the clutch C is shifted from one gear to another in throwing the clutch F into operation, the two positions of the clutch F necessarily correspond to the two extreme positions of the clutch C. In other words, the clutch F will always be in the position shown in Fig. 1 when the clutch C is in engagement with the gear A and will always be advanced a half-revolution from this position when the clutch is in engagement with the gear B. Such a construction is of especial advantage in machines where it is essential that an intermittently-operated device shall be in one of two positions or conditions when one of two mechanisms is in operation and shall be in the other position or condition when the other of the two mechanisms is in operation. The same construction with one of the mechanisms A or B omitted might be employed with advantage in cases where it is essential that an intermittently-operated device be in one of two positions or conditions when a mechanism is in operation and be in the other position or condition whenever the mechanism is out of operation. In such case the connection between the clutch for throwing the mechanism into and out of operation and the device for controlling the clutch for operating the intermittent mechanism would accurately and positively insure the proper operation and positioning of the intermittently-operated mechanism with relation to the operation or non-operation of the mechanism thrown into and out of operation by the clutch.

In Fig. 3 a modified arrangement of the device for controlling the operation of the clutch F is shown. In this construction the clutch F is provided with two diametrically opposite cams $f$, arranged in the same transverse plane, but at different distances from the axis of the clutch. These two cams coöperate with a single plunger J, which moves into the path of one cam as it is moved to disengage it from the other cam. For instance, as the plunger J is retracted from the position shown in Fig. 3 to the position shown in dotted lines it disengages the cam $f$ which is nearer the axis of the clutch, thus allowing the clutch to move into engagement with the clutch member F', and at the same time moves into the path of the cam $f$ which is farther from the axis of the clutch, so that as the clutch completes a half-revolution this cam acts against the plunger to disengage the clutch from the clutch member F'.

In Figs. 4 and 5 another modified construction of the devices for controlling the clutch F is shown. In this construction there is a single cam $f$ connected with the clutch, and this cam coöperates with two abutments J, arranged on diametrically opposite sides of the clutch. These abutments are in the form of arms secured to a rock-shaft K, which is rocked to disengage one of the abutments from the cam $f$ and simultaneously move the other abutment into the path of the cam, so that the clutch is thrown out after making a half-revolution. The rock-shaft K is connected with a shaft K' corresponding to the shaft $J^2$ in Fig. 2 by a rack-bar $K^2$, one end of which is provided with teeth engaging a pinion $K^3$ on the shaft K' and the other end of which is provided with rack-teeth engaging a segment $K^4$, secured to the rock-shaft.

In all the different forms of device for controlling the operation of the clutch F the clutch is thrown into and out of operation by coöperating rotary and non-rotary members, and in each case whenever a non-rotary member is withdrawn from engagement with a rotary member a non-rotary member is simultaneously moved into the path of a rotary member, so that the act of throwing the clutch into operation sets the devices for throwing the clutch out of operation, and consequently the proper timing and operation of the clutch is positively insured. As indicated in the modifications shown, one or more non-rotary members may be employed or one or more rotary members, the result and mode of operation being in general the same with the different arrangements of the rotary and non-rotary members.

What I claim, and desire to secure by Letters Patent, is—

1. The combination with two mechanisms, of an intermittently-operating mechanism, devices for throwing either of the two mechanisms into and out of operation and throwing the intermittent mechanism into operation when the throwing of either of the two mechanisms into operation follows the throwing of the other out of operation, substantially as described.

2. The combination with two mechanisms, of a clutch for throwing either mechanism into operation, and an intermittently-operating mechanism controlled through the movement of said clutch, substantially as described.

3. The combination with two mechanisms, of a clutch for throwing either mechanism into operation, an intermittently-operating clutch controlled through the movement of said former clutch, substantially as described.

4. The combination with two mechanisms, of a clutch for throwing either mechanism into operation, a second clutch, devices intermediate of the clutches for throwing said second clutch into operation when the engagement of the first clutch with either mechanism follows its disengagement from the other mechanism, substantially as described.

5. The combination of two mechanisms, a clutch for throwing either mechanism into operation, a second clutch, devices intermediate the clutches for throwing the second clutch into operation when the engagement of the first clutch with either mechanism follows its disengagement from the other mechanism and for throwing said second clutch out of operation after a half-revolution, substantially as described.

6. The combination with a mechanism, of a clutch for throwing said mechanism into and out of operation, a clutch-shifting device, a second clutch, devices for engaging and disengaging said second clutch controlled by the movement of the device for shifting the first clutch, substantially as described.

7. The combination with two mechanisms, of a clutch for throwing either mechanism into operation, a second clutch, rotary and non-rotary members coöperating to throw said second clutch out of operation, devices connected with said first clutch for withdrawing a non-rotary member from engagement with a rotary member and simultaneously moving a non-rotary member into the path of a rotary member, substantially as described.

8. The combination with a clutch, of one or more cams carried by the clutch, one or more abutments for coöperating therewith to hold the clutch out of operation, a second clutch, a device for throwing said second clutch into operation, and connections between said device and the abutment or abutments for withdrawing an abutment from engagement with a cam and simultaneously moving an abutment into the path of a cam, substantially as described.

9. The combination with two mechanisms, of a clutch for throwing either mechanism into operation, an intermittently-operating mechanism including a driven gear, a driving-gear having diametrically opposite blank spaces, a clutch for rotating said driving-gear, one or more cams carried by said clutch, one or more abutments for coöperating therewith to hold the clutch out of operation, devices connected with said first clutch for withdrawing an abutment from engagement with a cam and simultaneously moving an abutment into the path of a cam, locking-segments rotating with the driving-gear and coöperating locking-shoes rotating with the driven gear, substantially as described.

10. The combination with a driven gear, of a driving-gear having blank spaces, locking-segments corresponding with the blank spaces, pairs of locking-shoes rotating with the driven gear, each pair being separated by a clearance-space, a clutch for intermittently rotating the driving-gear, rotary and non-rotary members for throwing the clutch into and out of operation, and means for disengaging a non-rotary member from a rotary member and simultaneously moving a non-rotary member into the path of a rotary member, substantially as described.

11. The combination with a driven gear, of a driving-gear which makes the same number of revolutions and is provided with diametrically opposite blank spaces, and mechanism for intermittently rotating the driving-gear the distance between successive blank spaces, substantially as described.

12. The combination with a driven gear, of a driving-gear which makes the same number of revolutions and is provided with diametrically opposite blank spaces, a clutch for driving said gear, and devices for disengaging said clutch at each half-revolution, substantially as described.

13. The combination with a driven gear, of a driving-gear having a blank space, a locking-segment rotating with the driving-gear, coöperating locking-shoes rotating with the driven gear and separated by a clearance-space for the locking-segments, substantially as described.

14. The combination with a driven gear, of a driving-gear having diametrically opposite blank spaces, locking-segments corresponding with the blank spaces, two pairs of locking-shoes rotating with the driven gear each pair being separated by a clearance-space for the coöperating locking-segments, substantially as described.

RICHARD T. WINGO.

Witnesses:
W. H. THURSTON,
J. H. THURSTON.